Dec. 24, 1940.  B. H. KOOB  2,226,498
GLASS MELTING AND DELIVERING APPARATUS AND METHOD
Filed Aug. 27, 1938
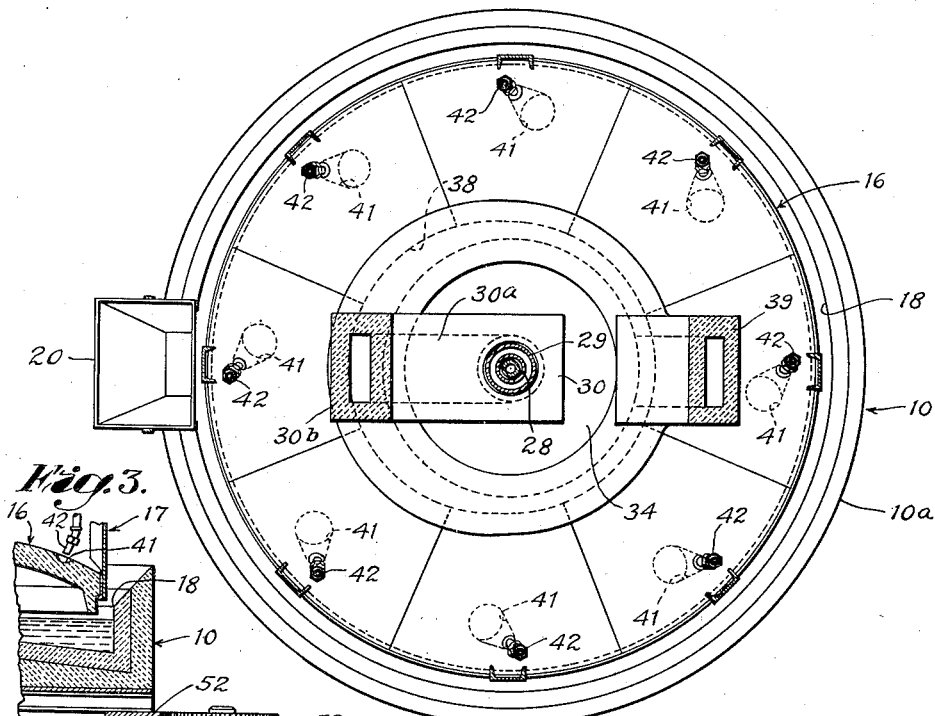
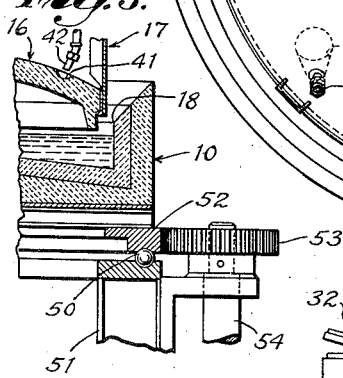
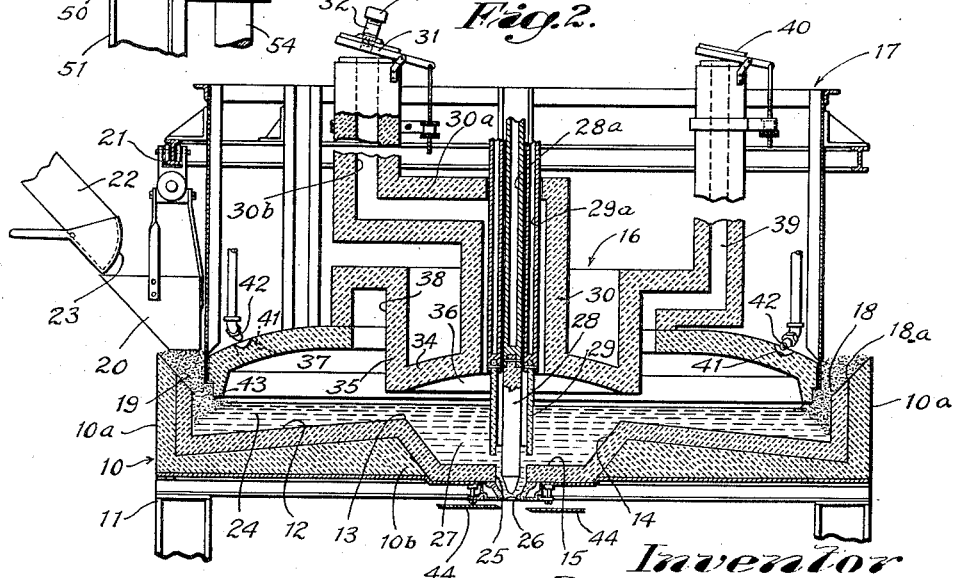
Inventor
Bernard H. Koob
by Brown & Parham
Attorneys
Witness
W. B. Thayer Patented Dec. 24, 1940

2,226,498

UNITED STATES PATENT OFFICE 2,226,498

GLASS MELTING AND DELIVERING APPARATUS AND METHOD

Bernard H. Koob, West Hartford, Conn., assignor to Hartford-Empire Company, Hartford, Conn., a corporation of Delaware Application August 27, 1938, Serial No. 227,026

9 Claims. (Cl. 49—53)

This invention relates to improvements in glass melting and delivering apparatus and methods, particularly for the purpose of obtaining molten glass in proper condition for fabrication into articles of glassware.

It is usual to melt and refine glass in a large tank or furnace in which a bath or body of molten glass is produced and maintained at a desired level in the tank or furnace by feeding glass-making materials or batch thereinto at one end thereof. The tank or furnace is heated as required to melt the glass-making materials therein and to refine the glass of the bath during the travel thereof longitudinally of the tank or furnace to one or more glass delivering tank extension flow channels or forehearths at the opposite end of the tank or furnace from the batch receiving end. Such an apparatus has certain faults and shortcomings which are inherent in the structure and in the operation thereof. For example, the glass body or bath necessarily moves in a generally rectilinear path along relatively cold refractory walls at the sides as well as at the bottom of the glass containing structure during the glass melting and refining stages of production and also during the movement of the glass in a tank extension or forehearth from which glass is to be delivered. The loss of heat through the walls of such apparatus and the tendency of different portions of the glass body or bath to have different temperatures and viscosities at different places in any transverse plane make difficult and costly the accomplishment of the result desired, i. e., the delivery of homogeneous glass of uniform temperature and proper condition for use in the manufacture of glass articles. Moreover the conditions within such an apparatus permit the production of cords and streaks in the moving glass which, when formed, may remain in the delivered glass and cause defects in the articles of glassware which are formed thereof.

An object of the present invention is to provide an apparatus for and a method of melting, refining and delivering molten glass which will be free from the above indicated and other faults and shortcomings of apparatus generally of the character above described.

A further object of the invention is to provide a unitary glass melting, refining and delivering apparatus which is so constructed, arranged and operable that the glass ingredients, on melting and fusing together to form molten glass, will move inward from the outer confining or side walls of the apparatus toward the center thereof and may be delivered from a delivery chamber located at the center of such apparatus.

A further object of the invention is the provision of a unitary glass melting, refining and delivering apparatus which affords facilities for the melting, refining and delivery of molten glass by a continuous operation which commences with the feeding of batch at all points around the side or confining walls of the apparatus, the melting of the batch and the refining of the molten glass during inward movement thereof to a delivery chamber at the center of the apparatus, and the controlled feeding or delivery of glass from such delivery chamber.

A further object of the invention is the provision of a glass melting, refining and delivering apparatus which is so constructed that the batch may be fed continuously in a thin layer of large aggregate area adjacent to the outer confining or side walls of the glass containing structure and in such manner that the layer of batch will be sufficiently thin to cast a light shadow in the melting zone, but will protect the entire flux line of the structure and will be fed thereinto only as required to replace the melted batch and therefore with a minimum of "dusting" and adverse effect on the walls of the structure.

A further object of the invention is the provision of a unitary glass melting, refining and delivering apparatus in which the pull exerted on the glass therein will be toward the center of the glass bath or body in the structure and away from the outer confining or side walls thereof, thereby tending to obviate or eliminate cords and streaks and making for homogeneity of the glass.

A further object of the invention is the provision of a unitary glass melting, refining and delivering apparatus which will require relatively little fuel for the glass melting, refining and conditioning operations.

A still further object of the invention is the provision of a glass melting, refining and delivering apparatus and method which will afford improved control of the temperature and condition of the glass throughout the various stages of melting, refining and delivering such glass.

A still further object of the invention is to provide a unitary glass melting, refining and delivering apparatus which may be of smaller size than is usual for a given glass production and output and which therefore tends to promote flexibility in production and overall plant efficiency in that a plurality of such apparatuses may be provided in a given plant and each may be rendered inactive temporarily for repair or other cause without interrupting the operations of the others or of machinery in the plant other than which is served by the inactive apparatus.

Other objects and advantages of the invention will be hereinafter pointed out or will become apparent from the following description of illustrative practical embodiments of the invention, as shown in the accompanying drawing, in which:

Figure 1 is a plan view, with certain portions shown in section, of a unitary glass melting, refining and delivering structure adapted to carry out the foregoing objects of the invention;

Fig. 2 is a transverse vertical section through the structure shown in Fig. 1; and Fig. 3 is a fragmentary vertical sectional view corresponding to a portion of Fig. 2 but showing structural provisions for rotatably supporting and rotating the glass containing structure of the apparatus instead of supporting it non-rotatably, as in Fig. 2.

Apparatus constructed according to invention as illustrated in Figs. 1 and 2 comprises a glass containing structure or tank, generally designated 10, which may be supported by a suitable supporting framework, such as that shown in part in Fig. 2 and generally designated 11. The tank 10 is of circular configuration in horizontal section and comprises a peripheral or continuous side wall 10a and a bottom 10b. These parts may be formed of any suitable material or materials in any suitable known way and may be insulated at their exterior at any place or places desired.

As shown, the bottom 10b has its upper or glass contacting surface inclined upwardly at 12 from its juncture with the peripheral or side wall 10 for the major part of the radial distance to the center of the tank, as to the circular line indicated at 13. From this line inward, the upper surface of the bottom 10b may be inclined rather sharply downwardly and inwardly at 14 for part of the remainder of the radial distance to the center line of the tank and thereafter may be substantially horizontal, as indicated at 15. With this arrangement, the interior of the tank 10 comprises an annular outer glass-melting and refining chamber of gradually decreasing depth radially thereof or inwardly toward the center of the tank and an inner or central delivery chamber which is continuous with and surrounded by the melting and refining chamber.

The tank is provided with a cover structure, generally designated 16, which may be supported in the required relationship with the tank by suitable supporting structure, such as that indicated generally at 17, Fig. 2. The cover may be formed of any suitable material or materials, such as a suitable refractory, and may be of sufficiently smaller diameter than the peripheral or side wall of the tank to provide an annular space 18 between the cover and the outer confining or side walls of the tank. This annular space constitutes a batch feed inlet and the portion of the peripheral wall of the tank which forms the outer wall of such inlet may be beveled from the upper edge thereof downwardly, as indicated at 18a, so that this batch inlet will taper in width from its top for part of its height.

In practice, the inlet 18 may be kept full of batch, as indicated at 19, Fig. 2, as by the use of any suitable batch feeding device. One form of device may comprise a batch feeding chute 20 suspended from an overhead track 21 so that the open lower end of the chute may be moved in a circle around the tank directly above the relatively wide, open upper part of the inlet 18. At one or more points in this path of movement of the chute 20, it may be brought to a batch receiving position beneath a supply pipe or conduit 22, the discharge end of which is controlled by a suitable movable valve or closure 23 which may be operated at the proper time to cause filling of the chute 20. Thereafter, as the chute 20 moves around the tank above the inlet 18, batch will pass therefrom into such inlet at the places and to the extent required to replace batch that has passed from such inlet into the glass bath 24 in the melting and refining chamber of the tank.

The bottom of the glass delivery chamber of the tank may be provided with a central glass feed orifice 25 with which a suitable orifice ring structure, indicated more or less diagrammatically at 26 may be associated. The orifice 25 together with that in the orifice ring structure 26 constitutes a glass delivering or feed outlet.

Glass from the supply or feed body, indicated at 27, Fig. 2, in the glass delivery chamber may be fed through the glass feed outlet under the control of any suitable feeding mechanism, which may comprise a vertically disposed refractory plunger 28 and a similarly disposed refractory tube 29. The upper portions of these glass feed controlling implements may be provided with cooling spaces, as indicated at 28a and 29a, respectively, through which water or any other suitable cooling medium may be circulated. These glass feed controlling implements may extend through an upwardly extending tubular central portion 30 of the cover structure and through a suitable opening at the top of the latter so that they may be connected above the cover with any suitable known supporting and operating mechanism (not shown). Thus, the member 28 may be supported and operated so that it is periodically reciprocated in the glass in the delivery chamber toward and away from the outlet to apply impulses to the glass at the outlet for purposes which are well known in the art. The tubular member 29 may be supported and operated so that it is adjustable toward and away from the bottom of the tank and such tubular member may also be rotated to aid in stirring the glass in the delivery chamber. Various kinds of mechanism for these purposes are well known in the art and may be readily supplied. Any other suitable known type of mechanism for controlling the feeding of the glass through the outlet may be used in lieu of that shown in the drawing.

The tubular portion 30 of the cover structure may extend at 30a laterally of the vertical central line of the cover structure to provide space for operating connections of the members 28 and 29 with their supporting and operating mechanism. Thereafter, this tubular portion of the cover structure may again extend vertically upward, as at 30b, and may be controlled at its upper end by a pivoted damper or closure 31. This damper or closure may be provided with a nipple 32 which may normally be closed by a removable cap 33. When the damper or closure is completely closed, the cap 33 may be removed and the nipple connected with a suitable source of supply of cooling air or other temperature influencing gaseous media which thus may be positively introduced into the space above the glass in the delivery chamber for the purpose of aiding in the control of the temperature and condition of such glass.

As shown, the space, indicated at 36, Fig. 2, above the glass in the delivery chamber has but relatively little height, the top wall thereof being a relatively low, flatly arched or convex-concave annular portion 34 of the cover structure immediately surrounding the lower end of the tubular portion 30 of such cover structure. The latter is formed to provide an upwardly extending annular wall 35 at the periphery of the portion 34. The wall 35 is located above the juncture of the melting and refining portion of the tank with the glass delivery chamber and the lower end of such wall may be near enough to the level of the glass therebeneath substantially to restrict communication between the space 36 above the glass in the delivery chamber and the space designated 37, above the glass in the melting and refining chamber of the tank. The space 37, which is shown as of greater height than the space 36, communicates at its inner periphery with an open-bottomed annular exhaust passage 38 which is formed in the cover structure 16 around the wall 35 and leads to a stack at 39. As shown to advantage in Fig. 1 the passage 38 decreases in width from a point diametrically opposite the juncture of that passage with the stack 39 to such juncture for the purpose of producing a substantially equal pull of the stack on all portions of such passage. The stack 39 may be provided at its upper end with a pivoted damper or closure 40 by which the draft produced by the stack on the passage 38 may be regulated.

The cover structure may be provided above the space 37 with burner ports 41. These ports may be of increasing area in cross section toward their inner ends and may be so formed in the cover structure as to be oblique to radial lines of the tank. The arrangement, as shown to advantage in Fig. 1, preferably is such that burners 42 which are associated with the burner ports 41 project combustible media and flames downwardly and obliquely in the space 37 between the outer and inner boundaries of such space at a plurality of uniformly spaced points around the tank. In other words, the flames and products of combustion are projected generally tangential to a circular line intermediate the radial width of the chamber 37 or slightly toward the wall 35, and there preferably are sufficient of these burner ports 41 and burners 42 to provide a practically continuous blanket of flames and heated products of combustion above all the glass in the melting and refining chamber. An annular wall or baffle 43, depending from the tank cover at the inlet 18, shields the batch in the inlet sufficiently from the flames and heat in the space 37 to prevent melting of such batch before it enters the tank.

The products of combustion pass from the space 37 through the passage 38 to the stack 39 and may entrain with them a slight volume of air from the space 36 and the communicating central stack 30, if there is an in-draft through the latter. If there is out-draft through the central stack 30, a slight amount of the combustion products may pass from the space 37 into the space 36 and thence out the stack of the latter. Burners or other known heating or temperature regulating means (not shown) may be provided for locally heating or controlling the temperature of the glass beneath the space 36.

In the operation of the apparatus as above described, the glass ingredients are fed continuously to the glass bath in the melting and refining compartment and are combined with the latter by the action of the heat applied thereto from the burners. The molten glass travels radially inward in the tank in a body of decreasing depth and is refined by the time such glass reaches the delivery chamber. The particular shape of the bottom or hearth of the melting and refining chamber facilitates the melting and refining of the glass therein. Convection currents of generally radial direction probably will be set up locally at all places around the melting and refining compartment and the reduction of depth of the inwardly moving glass of the bath permits escape of the bubbles and occluded gases so as to facilitate the fining of the glass.

In the delivery chamber, the glass is surrounded by oncoming homogeneous glass and may be fed from the outlet as desired. A glass severing mechanism, represented by the blades 44 may be provided and operated by any suitable operating mechanism to sever the glass fed from the outlet into charges of the shape and size desired.

In the modification shown in Fig. 3, the tank 10 is supported anti-frictionally, as at 50, on a suitable supporting structure 51 for rotation about its vertical axis, which may coincide with the axis of the feed outlet of the tank. For rotating the tank, a ring gear 52, carried thereby, may be engaged by a pinion 53 on a driven shaft 54. The rotation of the tank aids in subjecting the glass of the bath to like temperature regulating influences at all radii of the tank and also may aid in securing desirable commingling and mixing of the glass in the tank. Otherwise, the construction and operation of the embodiment of the invention partially shown in Fig. 3 may be identical with the structure and operation above described for the form of structure of Figs. 1 and 2.

Various other ways of operating the above described unitary glass melting and delivering apparatus and of controlling and regulating the operations of the component portions of such apparatus will be obvious to or readily occur to those skilled in the art. It will be understood also that the invention may be embodied in forms differing from those herein described and that the invention, while particularly well adapted for embodiment in structures designed to melt and refine glass and to deliver the molten glass through a submerged feed outlet for the production of mold charges, is not restricted to such embodiment or use as it is within the purview of the invention to melt and refine glass for delivery in any other suitable known way for any other suitable known purpose.

I claim:

1. Apparatus of the character described comprising a tank formed to provide a central chamber and an outer chamber surrounding the central chamber, the bottom of said outer chamber being upwardly inclined from its outer portion inwardly toward its juncture with the bottom of the central chamber, and heating means constructed and arranged to apply a practically continuous blanket of flames and heated products of combustion to the surface of a body of molten glass in said outer chamber.

2. Apparatus of the character described comprising a tank of substantially greater transverse dimensions than depth, said tank being formed to provide a central glass delivery chamber and an outer glass melting and refining chamber surrounding and in glass flow communication with the central chamber, said outer chamber having its bottom upwardly inclined from its outer portion inwardly toward its juncture with the bottom of the central chamber, means for feeding glassmaking materials to the glass melting and refining chamber, and heating means constructed and arranged to apply a practically continuous blanket of flames and heated products of combustion to the surface of the contents of said melting and refining chamber.

3. Glass melting, refining and delivering apparatus comprising a circular relatively shallow tank and a cover of less diameter than the tank and spaced therefrom to provide an annular inlet for batch at the inner periphery of the tank, means movable around the vertical axis of the apparatus above said annular inlet for feeding batch thereto to maintain said inlet filled with batch at all points around the tank, and means located at points spaced angularly around the vertical axis of the apparatus for applying heat to the batch and molten glass in said tank.

4. Glass melting, refining and delivering apparatus comprising a circular relatively shallow tank and a cover of less diameter than the tank and spaced therefrom to provide an annular inlet for batch at the inner periphery of the tank, means movable around the vertical axis of the apparatus above said annular inlet for feeding batch thereto to maintain said inlet filled with batch at all points around the tank, means located at points spaced angularly around the vertical axis of the apparatus for applying heat to the batch and molten glass in said tank, and a wall at the inner side of said inlet depending nearly to the level of the glass therebeneath for shielding the batch in the inlet from the direct action of said heat.

5. Glass melting, refining and deliverying apparatus comprising a circular tank of substantially greater diameter than depth, a cover of sufficiently less diameter than the tank to provide an annular inlet for batch at the inner periphery of the tank, said tank having a glass feed outlet in its bottom centrally thereof, said cover being formed to provide a relatively low central portion having its marginal wall located slightly above the normal level of the glass in said tank, an annular outlet passage surrounding said central portion, and a higher outer portion extending from said outlet passage to said inlet for batch, said outer portion of the cover having spaced burner ports therein, a stack communicating with said outlet passage, and a second stack communicating with the space above the glass in the central portion of the tank beneath said relatively low central portion of said cover.

6. Glass melting, refining and delivering apparatus comprising a circular relatively shallow tank having its bottom formed to provide a central glass delivery chamber and an outer annular melting and refining chamber surrounding and continuous with the delivery chamber, a cover supported above the normal level of the glass in the tank, means for feeding batch into said tank at the inner periphery thereof, said cover being formed to provide an annular outlet passage for gases above the inner portion of said melting and refining chamber and with burner ports spaced angularly about the vertical axis of the cover between said outlet passage and the periphery of said cover, burners arranged to discharge a combustible fuel mixture through said ports into the space above the glass in the melting and refining chamber in directions oblique to radii of the apparatus, means for controlling exhaust of gases from said outlet passage, and means for controlling pressure and thermal conditions within the space above the glass in the delivery chamber of the tank.

7. Glass melting, refining and delivering apparatus comprising a circular relatively shallow tank having its bottom formed to provide a central glass delivery chamber and an outer annular melting and refining chamber surrounding and continuous with the delivery chamber, a cover supported above the normal level of the glass in the tank, means for feeding batch into said tank at the inner periphery thereof, said cover being formed to provide an annular outlet passage for gases above the inner portion of said melting and refining chamber and with burner ports spaced angularly about the vertical axis of the cover between said outlet passage and the periphery of said cover, burners arranged to discharge a combustible fuel mixture through said ports into the space above the glass in the melting and refining chamber in directions oblique to radii of the apparatus, a dampered stack communicating with said outlet passage at a place located at one side of the vertical axis of the cover, said outlet passage increasing in cross sectional area from said place of communication with the stack to a place diametrically opposite thereto, and another dampered stack communicating with the space above the glass in said delivery chamber.

8. Glass melting, refining and delivering apparatus comprising a circular relatively shallow tank having its bottom formed to provide a central glass delivery chamber and an outer annular melting and refining chamber surrounding and continuous with the delivery chamber, a cover supported above the normal level of the glass in the tank, means for feeding batch into said tank at the inner periphery thereof, said cover being formed to provide an annular outlet passage for gases above the inner portion of said melting and refining chamber and with burner ports spaced angularly about the vertical axis of the cover between said outlet passage and the periphery of said cover, burners arranged to discharge a combustible fuel mixture through said ports into the space above the glass in the melting and refining chamber in directions oblique to radii of the apparatus, means for controlling exhaust of gases from said outlet passage, a passage communicating at one end with the space above the glass in the delivery chamber and having its other end located in the atmosphere, a pivoted closure for the last named end of said passage, a nipple operatively connected with said closure, and a removable cap on said nipple.

9. The method of melting, refining and delivering glass which comprises providing a supply body of molten glass of circular cross-sectional configuration and of a depth which decreases from the peripheral portion of the supply body for part of the radial distance to the center thereof and of greater depth at the central portion of the supply body, removing glass from said central portion of the supply body to cause a radially inward pull on the glass of the remainder of the supply body, adding batch to the supply body uniformly around the periphery thereof to compensate for said removal of glass and applying heat to said batch and a practically continuous blanket of flames and heated products of combustion to the surface of the inwardly moving glass of the portion of the supply body of decreasing depth to cause the batch to melt and coalesce with such inwardly moving glass and the inwardly moving glass to be refined during its travel toward the center of said supply body.

BERNARD H. KOOB.